(12) United States Patent
Hauber et al.

(10) Patent No.: US 12,319,367 B2
(45) Date of Patent: Jun. 3, 2025

(54) METHOD FOR MONITORING A STEERING DEVICE

(71) Applicant: Robert Bosch GmbH, Stuttgart (DE)

(72) Inventors: Axel Hauber, Schorndorf (DE); Mark Philipp Riek, Abtsgmuend (DE)

(73) Assignee: Robert Bosch GmbH, Stuttgart (DE)

( * ) Notice: Subject to any disclaimer, the term of this patent is extended or adjusted under 35 U.S.C. 154(b) by 782 days.

(21) Appl. No.: 17/423,224

(22) PCT Filed: Dec. 7, 2019

(86) PCT No.: PCT/EP2019/084101
§ 371 (c)(1),
(2) Date: Jul. 15, 2021

(87) PCT Pub. No.: WO2020/164773
PCT Pub. Date: Aug. 20, 2020

(65) Prior Publication Data
US 2022/0105980 A1 Apr. 7, 2022

(30) Foreign Application Priority Data

Feb. 14, 2019 (DE) ...................... 10 2019 202 017.8

(51) Int. Cl.
*B62D 5/04* (2006.01)
*F16H 7/02* (2006.01)

(52) U.S. Cl.
CPC ......... *B62D 5/0487* (2013.01); *B62D 5/0424* (2013.01); *B62D 5/0484* (2013.01); *B62D 5/0493* (2013.01)

(58) Field of Classification Search
None
See application file for complete search history.

(56) References Cited

U.S. PATENT DOCUMENTS

| 8,798,861 B2* | 8/2014 | Mitsuhara | B62D 15/0245 |
| | | | 701/41 |
| 9,975,572 B2* | 5/2018 | Sasaki | B62D 5/0493 |
| | | (Continued) | |

FOREIGN PATENT DOCUMENTS

| CN | 106687359 A | 5/2017 |
| CN | 107848573 A | 3/2018 |
| | (Continued) | |

OTHER PUBLICATIONS

International Search Report corresponding to PCT Application No. PCT/EP2019/084101, mailed Mar. 31, 2020 (German and English language document) (5 pages).

*Primary Examiner* — David P. Merlino
*Assistant Examiner* — Mahmoud M Kazimi
(74) *Attorney, Agent, or Firm* — Maginot, Moore & Beck LLP

(57) ABSTRACT

A method for monitoring a steering device including a steering gear, a first steering actuator, a second steering actuator, a first traction mechanism drive with a first traction mechanism configured to connect the first steering actuator to the steering gear, and a second traction mechanism drive with at least one second traction mechanism configured to connect the second steering actuator to the steering gear, includes determining at least one first position parameter of the first steering actuator, and at least one second position parameter of the second steering actuator. The method includes evaluating the first position parameter and the second position parameter to determine that an unintentional change in position of at least one of the first traction mechanism and the second traction mechanism has occurred, and definitely associating the unintentional change in position with one of the first and second traction mechanism drives.

14 Claims, 2 Drawing Sheets

(56) References Cited

U.S. PATENT DOCUMENTS

| | | | |
|---|---|---|---|
| 10,899,342 B1* | 1/2021 | Brown | B60W 30/025 |
| 2009/0303065 A1 | 12/2009 | Lipowski | |
| 2013/0131899 A1 | 5/2013 | Jung et al. | |
| 2015/0239492 A1* | 8/2015 | Yukitake | B62D 5/0484 |
| | | | 701/43 |
| 2019/0381998 A1* | 12/2019 | Anderson | B60W 30/02 |

FOREIGN PATENT DOCUMENTS

| | | | |
|---|---|---|---|
| CN | 109305213 A | 2/2019 | |
| DE | 10052275 A1 * | 5/2002 | B62D 5/0424 |
| DE | 103 16 599 A1 | 11/2004 | |
| DE | 103 29 292 A1 | 1/2005 | |
| DE | 10 2008 021 849 A1 | 11/2009 | |

* cited by examiner

METHOD FOR MONITORING A STEERING DEVICE

This application is a 35 U.S.C. § 371 National Stage Application of PCT/EP2019/084101, filed on Dec. 7, 2019, which claims the benefit of priority to Serial No. DE 10 2019 202 017.8, filed on Feb. 14, 2019 in Germany, the disclosures of which are incorporated herein by reference in their entirety.

BACKGROUND

The disclosure is based on a method for monitoring a steering device. In addition, the disclosure relates to a control unit with a computing unit for carrying out such a method and a steering device with a computing unit for carrying out such a method.

From the prior art, for example DE 100 52 275 A1, steering devices are known which comprise a steering gear, at least one first electric motor, at least one second electric motor, at least one first belt drive for connecting the first electric motor to the steering gear and at least one second belt drive for connecting the second electric motor to the steering gear. Such steering devices are, for example, used in redundant, conventional steering systems with mechanical feedthrough between the steering wheel and the steering gear, in so-called steer-by-wire steering systems without mechanical feedthrough between the steering wheel and the steering gear and/or in steering systems for commercial vehicles with electric steering support.

With the use of belt drives or other traction mechanism drives, however, there is the problem that in operation and under certain conditions unintentional changes in position of the traction mechanism used may occur, for example in the form of a slip and/or a belt jump. In conventional steering systems these unintentional changes in position typically lead to a tilted steering wheel when driving straight ahead. In steer-by-wire steering systems or autonomous vehicles without a steering wheel, however, such visual error detection is absent, so that without sufficiently precise detection of the unintentional change in position safety-critical driving situations can arise. Further problems arise, for example, when using a steering system with a software end stop for a steering angle. In contrast to a steering system with a mechanical end stop, an unintentional change in the position of a traction mechanism may lead to impairment of the functionality of the software end stop and may also lead to mechanical damage to the vehicle, in particular in commercial vehicles with relatively large-sized electric motors.

For this reason, for example, in DE 10 2008 021 849 A1 the use set of a belt jump detection device is proposed, which recognizes a belt jump by evaluating a manual torque applied to the steering wheel, a manual angle applied to the steering wheel and a steering angle of the vehicle wheels. However, a detection of a belt jump on the basis of a detected manual torque leads to problems, for example in steer-by-wire steering systems or autonomous vehicles without a steering wheel. In addition, in particular when using a number of belt drives, which of the corresponding belts has jumped cannot be detected safely, whereby in particular repair and/or maintenance costs are increased.

Based on this, the object of the disclosure is in particular to provide a method and a steering device with improved properties with respect to efficiency. The object is achieved by the features of the disclosure, while advantageous embodiments and further developments of the disclosure can be taken from the disclosure.

SUMMARY

The disclosure is based on a method for monitoring a steering device, wherein the steering device comprises a steering gear, at least one first steering actuator, at least one second steering actuator, at least one first traction mechanism drive with at least one first traction mechanism for connecting the first steering actuator to the steering gear and at least one second traction mechanism drive with at least one second traction mechanism for connecting the second steering actuator to the steering gear, and wherein at least one first position parameter of the first steering actuator and at least one second position parameter of the second steering actuator is determined.

It is proposed that by evaluating the position parameters, in particular the first position parameter and the second position parameter, an unintentional change in position of the first traction mechanism and/or the second traction mechanism is determined, and the unintentional change of position is definitely associated with one of the traction mechanism drives, in particular the first traction mechanism drive or the second traction mechanism drive. In particular, the unintentional change in position of the first traction mechanism and/or the second traction mechanism is determined by evaluation of the position parameters in such a way that the unintentional change of position can be definitely associated with one of the traction mechanism drives. By this design, in particular an efficiency, in particular a maintenance efficiency, a time efficiency, a component efficiency, a computational efficiency and/or a cost efficiency can be improved. In addition, in particular, a particularly robust detection and/or evaluation of the unintentional change in position can be achieved and, in particular, a particularly high level of operational safety can be guaranteed when a software end stop is used for a steering angle. Further, in particular by evaluating the position parameters of the steering actuators, a particularly high flexibility and/or variability can be achieved, so that the method may be used advantageously in many different vehicles, in particular with conventional steering systems and/or steer-by-wire steering systems. In addition, repair and/or maintenance can be simplified in particular by the definite association with one of the traction mechanism drives.

A "steering device" is to be understood in this context in particular to be at least one part, in particular a subassembly, a steering system, in particular of a vehicle, preferably a motor vehicle and particularly preferably a commercial vehicle. In particular, the steering device may also include the entire steering system. In addition, the steering device in particular comprises a computing unit which is provided to carry out the method for monitoring the steering device. In addition, the steering device may comprise other components and/or assemblies, such as a control unit, a first position sensor unit for detecting the first position parameter and/or a second position sensor unit for detection the second position parameter. The term "provided" is to be understood in particular to mean specially programmed, designed and/or equipped. Where an object is provided for a particular function, it is to be understood in particular that the object fulfills and/or carries out this particular function in at least one application state and/or operating state.

Furthermore, a "steering actuator" is to be understood in particular to be an in particular electrically embodied actuator unit, which in particular has a working connection to the steering gear and in particular is provided to transfer a steering torque to the steering gear and thereby to advantageously influence a direction of travel of the vehicle. The steering actuator is preferably provided to provide a steering torque to support a manual torque applied to a steering handle and/or a steering torque for automatic and/or autonomous control of a direction of travel of the vehicle. For this purpose, the steering actuator can comprise at least one electric motor. The electric motor is advantageously designed as a brushless motor and preferably as an asynchronous motor or as a permanently excited synchronous motor. In the present case, the first steering actuator and the second steering actuator are provided in particular to work together to provide the steering torque, wherein the first steering actuator and the second steering actuator can be operated in particular individually and/or advantageously simultaneously. Further, a "traction mechanism drive" is to be understood in particular to be a transmission unit with a working connection in particular to the first steering actuator and the steering gear or the second steering actuator and the steering gear, and which is provided in particular to transfer a driving force and/or a steering torque from the first steering actuator or the second steering actuator to the steering gear. For this purpose, the traction mechanism drive comprises at least one traction mechanism. In addition, the traction mechanism drive can comprise in particular at least one drive element, in particular associated with the corresponding steering actuator and advantageously in the form of a drive wheel and/or a drive shaft, and/or at least one output element, in particular associated with the steering gear and preferably in the form of an output wheel and/or output shaft. Particularly advantageously, an output element of the first traction mechanism drive and an output element of the second traction mechanism drive are identical to each other, in particular such that the first traction mechanism and the second traction mechanism are coupled to the same output element and/or act on the same output element. In addition, the traction mechanism drive could be in the form in particular of a force-locking traction mechanism drive. Advantageously, however, the traction mechanism drive is in the form of a positive-locking traction mechanism drive.

In addition, a "computing unit" is to be understood in particular to be an electrical and/or electronic unit having an information input, information processing and an information output. Advantageously, the computing unit further has at least one processor, at least one operating memory, at least one input and/or output means, at least one operating program, at least one regulation routine, at least one control routine, at least one calculation routine and/or at least one evaluation routine. In particular, the computing unit is provided to determine and/or receive at least one first position parameter of the first steering actuator and at least one second position parameter of the second steering actuator and especially to evaluate these for monitoring the steering device. In addition, the computing unit is provided in particular to determine by evaluation of the position parameters an unintentional change in position of the first traction mechanism and/or the second traction mechanism and to definitely associate the unintentional change in position with one of the traction mechanism drives. Advantageously, the computing unit is also integrated into the control unit. Furthermore, a "position parameter" is to be understood in particular to be a parameter which is correlated with a location, in particular a position, an orientation and/or a condition, of the corresponding steering actuator and in particular a rotor element of an electric motor of the corresponding steering actuator. In particular, at least on the basis of the position parameter a current position of the corresponding steering actuator and in particular the rotor element can be concluded and/or a current position of the corresponding steering actuator and in particular the rotor element can be determined. Preferably, the position parameter is a rotor position and/or an angular position of the corresponding steering actuator and in particular of the rotor element. Further, an "unintentional change in position" of a traction mechanism in particular is to be understood to mean a change in the position of the traction mechanism, in particular relative to the drive element, the output element, the corresponding steering actuator and/or the steering gear, which impairs normal operation of the steering device and/or the vehicle. The unintentional change in position may correspond, for example, to clutch slip, slip, in particular sliding slip, and/or a jump of the corresponding traction mechanism.

The first traction mechanism drive and/or the second traction mechanism drive may be in the form in particular of a chain drive with a traction mechanism in the form of a chain. However, it is advantageously proposed that the first traction mechanism drive and/or the second traction mechanism drive is in the form of a belt drive with a traction mechanism in the form of a belt. In this context, the first traction mechanism and/or the second traction mechanism could be in the form, for example, of flat belts, of round belts, of V-belts and/or of ribbed V-belts. Particularly preferably, however, it is proposed that a toothed belt is used as a traction mechanism. In this case, the first traction mechanism and/or the second traction mechanism is consequently in the form of a toothed belt. Furthermore, the unintentional change of position in this case corresponds in particular to a belt jump. Due to this design, in particular, quiet and low-noise running of the first traction mechanism drive and/or the second traction mechanism drive and simple maintenance and/or low maintenance can be achieved.

Furthermore, it is proposed that at least one control parameter of the steering device is determined, and the evaluation of the position parameters includes a comparison of the first position parameter and/or the second position parameter with the control parameter, advantageously by forming a difference. A "control parameter" is to be understood in this context to be in particular a parameter which is correlated with an output signal and/or a control signal of the steering gear, which is provided in particular to change a steering angle of steerable vehicle wheels of the vehicle and/or to cause a steering movement of the vehicle wheels. In particular, at least based on the control parameter, the output signal and/or the control signal of the steering gear can be concluded and/or the output signal and/or the control signal of the steering gear can be determined. Preferably, in this case the steering device comprises a sensor unit, preferably associated with the steering gear, with at least one sensor element, in particular in the form of a relative sensor or an absolute sensor, for detecting the control parameter. Particularly preferably, the control parameter corresponds to a detection signal, in particular in the form of an angle signal, of the sensor unit. As a result, in particular, a particularly simple evaluation of the position parameters can be achieved, in particular using a particularly simple computational algorithm.

Furthermore, it is proposed that the control parameter is determined by means of a sensor unit associated with the steering gear, in particular the previously mentioned sensor unit, and a resolution, in particular an angular resolution, of the sensor unit is taken into account in the evaluation of the position parameters. In particular, the resolution of the sensor unit can be taken into account at least in determining a value of the unintentional change in position of the corresponding traction mechanism and advantageously a number of skipped teeth in a traction mechanism in the form of a toothed belt. Further, in particular, an evaluation method for evaluating the position parameters can be adapted and/or varied depending on the resolution of the sensor unit. In particular, a particularly accurate and/or reliable evaluation of the position parameter can be achieved as a result of this.

In a further embodiment, it is proposed that at least one transmission ratio parameter between the first steering actuator and the sensor unit and/or between the second steering actuator and the sensor unit is taken into account in the evaluation of the position parameters. A "transmission ratio parameter" is to be understood in this context to mean in particular a parameter which is correlated with a transmission ratio, in particular a gear ratio, between the first steering actuator and the sensor unit and/or between the second steering actuator and the sensor unit. In particular, at least on the basis of the transmission ratio parameter the transmission ratio between the first steering actuator and the sensor unit and/or between the second steering actuator and the sensor unit can be concluded and/or the transmission ratio between the first steering actuator and the sensor unit and/or between the second steering actuator and the sensor unit can be determined. Advantageously, at least one first transmission ratio parameter between the first steering actuator and the sensor unit and at least one second transmission ratio parameter between the second steering actuator and the sensor unit is taken into account in the evaluation of the position parameters. Due to this embodiment, in particular a transmission ratio in the steering device can be taken into account, whereby advantageously a particularly flexible and easily adaptable methodology can be provided.

A particularly robust method can be provided in particular, if at least one initial offset parameter is determined at least depending on the first position parameter and the sensor parameter and/or depending on the second position parameter and the sensor parameter and the initial offset parameter is taken into account in the evaluation of the position parameters. An "initial offset parameter" is to be understood in this context in particular to mean a parameter which is correlated with an initial deviation, in particular a deviation occurring and/or applying at a system start of the steering device, of the steering system and/or of the vehicle, between the first position parameter and the sensor parameter and/or between the second position parameter and the sensor parameter and which is advantageously determined by forming a difference of a first initial position parameter and an initial control parameter and/or a second initial position parameter and an initial control parameter. Preferably, the initial offset parameter is determined at regular intervals, such as hourly, daily and/or preferably at each system start. Further, advantageously at least one first initial offset parameter is determined as a function of the first position parameter and the sensor parameter and at least one second initial offset parameter is determined as a function of the second position parameter and the sensor parameter and is taken into account in the evaluation of the position parameters.

Further, it is proposed that at least one angle segmentation of at least one output element of the first traction mechanism drive and/or the second traction mechanism drive is taken into account in the evaluation of the position parameters. An "angle segmentation" in particular, is to be understood here to mean an angle between two teeth of the output element and/or an angular resolution of the output element. In this way, in particular, a particularly simple evaluation algorithm can be provided.

Alternatively or additionally, it is proposed that the evaluation of the position parameters includes a comparison of the first position parameter with the second position parameter, advantageously by forming a difference. Through this embodiment in particular, a particularly resource-saving and/or robust evaluation of the position parameters can be achieved and at the same time operational safety can be increased. In this respect, an evaluation of the position parameters can be achieved in particular even if a sensor unit for detecting a control parameter, in particular the aforementioned sensor unit, has too low a resolution, a disturbance and/or a defect and/or if such a sensor unit is dispensed with.

Further, in particular, a robustness can be increased in this case, if at least one further initial offset parameter is determined as a function of the first position parameter and the second position parameter, and the further initial offset parameter is taken into account in the evaluation of the position parameters. The further initial offset parameter is, in particular analogous to the initial offset parameter, correlated with an initial deviation, in particular a deviation occurring and/or applying at a system start of the steering device, the steering system and/or the vehicle, between the first position parameter size and the second position parameter and is advantageously determined from the first initial position parameter and the second initial position parameter by forming a difference. The further initial offset parameter is thereby preferably determined in a way analogous to the initial offset parameter and thus advantageously at regular intervals, preferably at each system start.

Further, it is proposed that also in this case at least one angle segmentation, in particular the aforementioned angle segmentation, at least of an output element of the first traction mechanism drive and/or of the second traction mechanism drive is taken into account in the evaluation of the position parameters, whereby in particular a particularly simple evaluation algorithm can be provided.

In addition, it is proposed that the evaluation of the position parameters and/or the definite association of the unintentional change in position with one of the traction mechanism drives includes a comparison of a first speed parameter of the first steering actuator with a second speed parameter of the second steering actuator. A "speed parameter" is in particular to be understood to mean a parameter which is correlated with a speed, in particular an operating speed, of the corresponding steering actuator and in particular of a rotor element of an electric motor of the corresponding steering actuator. In particular, at least based on the speed parameter a current speed of the corresponding steering actuator and in particular of the rotor element can be concluded and/or a current speed of the corresponding steering actuator and in particular of the rotor element can be determined. Preferably, the speed parameter is a rotor speed and/or an angular velocity of the corresponding steering actuator and in particular of the rotor element. In addition the first speed parameter is preferably determined by means of a differentiation of the first position parameter and/or the second speed parameter is preferably determined by means of a differentiation of the second position parameter. As a result of this, in particular, a particularly simple and/or cost-effective association of the unintentional change in position with one of the traction mechanism drives can be achieved.

The method for monitoring the steering device, the control unit and the steering device should not be limited to the application and embodiment described above. In particular, the method for monitoring the steering device, the control unit and the steering device for the fulfillment of a mode of operation described herein can have a different number of individual elements, components and units from the number mentioned herein.

BRIEF DESCRIPTION OF THE DRAWINGS

Further advantages result from the following description of the drawings. In the drawings, an exemplary embodiment of the disclosure is shown. The drawings, and the description contain numerous aspects of the disclosure. The person skilled in the art will consider these aspects expediently and individually and will combine them into meaningful further combinations.

In the figures.

DETAILED DESCRIPTION

Figure 1:
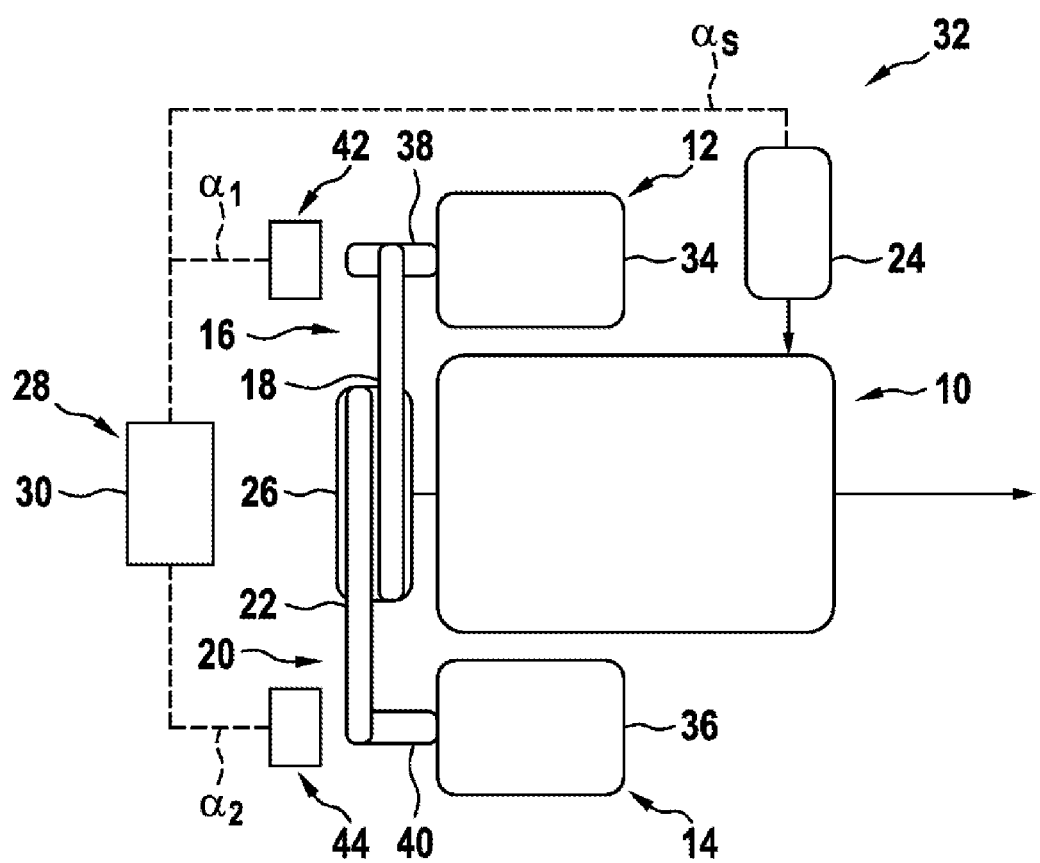
FIG. 1 shows at least part of a steering system with an exemplary steering device in a schematic illustration and FIG. 2 shows an exemplary flowchart of a method for monitoring the steering device.

FIG. 1 shows at least one part of a steering system 32 with an exemplary steering device in a schematic representation. The steering system 32 is in the present case in the form of an electrically assisted steering system. Further, the steering system 32 is provided for use in a vehicle (not shown), advantageously a commercial vehicle. When installed, the steering system 32 has a working connection to vehicle wheels of the vehicle and is provided to influence a direction of travel of the vehicle. Further, the steering system 32 can be in the form of a conventional steering system with a mechanical feedthrough or of a so-called steer-by-wire steering system, in which a steering command is forwarded exclusively electrically to the vehicle wheels. In addition, the steering system 32 in the present case may include in particular a software end stop for a steering angle. Alternatively, however, a vehicle could also be in the form of a passenger car or the like. In addition, it is conceivable to dispense with a software end stop and, for example, to use a mechanical end stop.

The steering device has a steering gear 10. The steering gear 10 is in the present case in the form of a known steering gear 10, in particular a commercial vehicle steering gear. The steering gear 10 has a working connection to at least two of the vehicle wheels, in particular steerable vehicle wheels and advantageously front wheels of the vehicle. The steering gear 10 is provided to provide an output signal and/or a control signal to cause a pivoting movement and/or a rotary movement of the vehicle wheels.

Further, the steering device has a number of steering actuators 12, 14, in the present case in particular a first steering actuator 12 and a second steering actuator 14. The steering actuators 12, 14 are formed separately from each other and arranged at a distance from each other. The steering actuators 12, 14 are designed for example to be identical to each other. In principle, however, it is also conceivable to design steering actuators 12, 14 differently. In addition, the steering actuators 12, 14 each have a working connection to the steering gear 10. Each of the steering actuators 12, 14 is provided to provide a steering torque for generating and/or influencing the output signal and/or the control signal of the steering gear 10 and to transmit this to the steering gear 10. In the present case, the steering actuators 12, 14 are provided to work together to provide a total steering torque, wherein in particular the steering actuators 12, 14 are operated simultaneously.

For this purpose, each of the steering actuators 12, 14 has at least one electric motor 34, 36. The electric motors 34, 36 are in the form of rotary motors and each has a rotor element (not shown). The electric motors 34, 36 are in the present case in the form of permanently excited synchronous motors. In principle, however, at least one of the electric motors 34, 36 could also be in the form of another electric motor which is different from a permanently excited synchronous motor. Further, at least one of the steering actuators 12, 14 could also comprise a number of electric motors or an electric motor with a number of separate and/or separately energizable windings.

For connecting the steering actuators 12, 14 to the steering gear 10, the steering device further comprises a number of traction mechanism drives 16, 20, in the present case in particular a first traction mechanism drive 16 for connecting the first steering actuator 12 to the steering gear 10 and a second traction mechanism drive 20 for connecting the second steering actuator 14 to the steering gear 10. The traction mechanism drives 16, 20 are formed separately from each other. The traction mechanism drives 16, 20 are for example structurally identical to each other and consequently have in particular the same traction mechanism transmission ratio. In principle, however, it is also conceivable to design the traction mechanism drives 16, 20 differently. The traction mechanism drives 16, 20 are in the present case each in the form of a belt drive. Further, the traction mechanisms drives 16, 20 are each in the form of a positive-locking traction mechanism drive. The traction mechanism drives 16, 20 are each provided to transfer the steering torque of the corresponding steering actuator 12, 14 to the steering gear 10. Alternatively however, at least one of the traction mechanism drives 16, 20 could also be in the form of a chain drive and/or a force-locking traction mechanism drive.

The first traction mechanism drive 16 comprises a first drive element 38 associated with the first steering actuator 12 and in the form of a drive shaft. The first drive element 38 is formed separately from the first steering actuator 12 and is attached to it. In principle, however, a first drive element could also be formed in one piece with a first steering actuator. In addition, the first traction mechanism drive 16 has an output element 26 associated with the steering gear 10 and in the form of an output wheel. In addition, the first traction mechanism drive 16 has a first traction mechanism 18. The first traction mechanism 18 is in the form of a belt, in the present case in particular of a toothed belt. The first traction mechanism drive 18 connects the first drive element 38 and the output element 26 to each other. The first traction mechanism 18 connects the first drive element 38 and the output element 26 together and is used for force transmission between the first drive element 38 and the output element 26.

The second traction mechanism drive 20 comprises a second drive element 40 associated with the second steering actuator 14 and in the form of a drive shaft. The second drive element 40 is formed separately from the second steering actuator 14 and is attached to it. In principle, however, a second drive element could also be formed in one piece with a second steering actuator. An output element of the second traction mechanism drive 20 is identical with the output element 26 of the first traction mechanism drive 16. In addition, the second traction mechanism drive 20 has a second traction mechanism 22. The second traction mechanism 22 is in the form of a belt, in the present case in particular of a toothed belt. The second traction mechanism 22 connects the second drive element 40 and the output element 26 to each other and is used for force transmission between the second drive element 40 and the output element 26. Alternatively, it is also conceivable to design at least one of the traction mechanisms 18, 22 as flat belts, as a round belt, as a V-belt and/or as a ribbed V-belt. In addition, an output element of a first traction mechanism drive and an output element of a second traction mechanism drive could be formed differently and/or separately from each other.

In addition, the steering device comprises a number of position sensor units 42, 44, in particular a first position sensor unit 42 associated with the first steering actuator 12 and a second position sensor unit 44 associated with the second steering actuator 14. The position sensor units 42, 44 are identical to each other and each is in the form of a relative sensor. In the present case, the position sensor units 42, 44 are each in the form of a rotor position sensor. The first position sensor unit 42 is provided for detecting a first position parameter $\alpha_1$ of the first steering actuator 12. The first position parameter $\alpha_1$ corresponds in the present case to a rotor position and/or an angular position of the first steering actuator 12. The second position sensor unit 44 is provided for detecting a second position parameter $\alpha_2$ of the second steering actuator 14. The second position parameter $\alpha_2$ corresponds in the present case to a rotor position and/or an angular position of the second steering actuator 14. In principle, however, it is also conceivable to dispense with at least one of the position sensor units 42, 44. In addition, a position parameter could also correspond to a variable of a corresponding steering actuator which is different from a rotor position and/or an angular position. Furthermore, it is conceivable to design at least one position sensor unit as an absolute sensor.

Furthermore, the steering device in the present case has a sensor unit 24 associated with the steering gear 10. The sensor unit 24 is in the form of an absolute sensor. The sensor unit 24 is in the form of a combined torque and rotation angle sensor. The sensor unit 24 is provided for detecting a control parameter $\alpha_s$ of the steering device, which in particular is correlated with the output signal and/or the control signal of the steering gear 10. In principle, however, the sensor unit 24 could be dispensed with. In addition, it is conceivable to design a sensor unit as a sensor which is different from a combined torque and rotation angle sensor, for example as a purely torque sensor or rotation angle sensor, and/or as an absolute sensor.

Further, the steering device has at least one control unit 28. The control unit 28 has a working connection to the steering actuators 12, 14 and/or the position sensor units 42, 44. In addition, the control unit 28 has a working connection to the steering gear 10 and/or the sensor unit 24. The control unit 28 is at least provided to receive and evaluate the first position parameter $\alpha_1$ and the second position parameter $\alpha_2$. In addition, the control unit 28 is provided in the present case to receive and evaluate the control parameter $\alpha_s$.

For this purpose, the control unit 28 comprises a computing unit 30. The computing unit 30 comprises at least one processor (not shown), for example in the form of a microprocessor, and at least one operating memory (not shown). In addition, the computing unit 30 comprises at least one operating program located in the operating memory with at least one calculation routine, at least one control routine and at least one evaluation routine. In principle, however, it is also conceivable to form a control unit separately from a steering device. In this context, a vehicle could, for example, have a single central control unit with a central computing unit. Further, a steering device could comprise a number of, in particular separate, control units and/or a number of, in particular separate, computing units, which in particular can be communicatively connected to each other. In this context, for example, it is conceivable to associate each steering actuator with a dedicated control unit.

With the use of traction mechanism drives, such as the traction mechanism drives 16, 20 referred to at the beginning, there is the problem that in operation and under certain conditions unintentional changes in position of the corresponding traction mechanism can occur, in the present case in particular in the form of a belt jump. Such unintentional changes in position can lead to safety-critical driving situations without sufficiently precise detection. Furthermore, in particular with the use of a number of traction mechanism drives, repair and/or maintenance costs are significantly reduced if the unintentional change in position can be definitely associated with one of the traction mechanism drives.

For the determination and association of such unintentional changes in the position of the traction mechanism 18, 22 of the traction mechanism drives 16, 20, a method for monitoring the steering device is therefore proposed. In the present case, in particular, the computing unit 30 is provided, in particular by means of the calculation routine and/or the evaluation routine, to carry out the method and in particular has a computer program with corresponding program code means for this purpose.

According to the disclosure, for monitoring the steering device the first position parameter $\alpha_1$ of the first steering actuator 12 and the second position parameter $\alpha_2$ of the second steering actuator 14 are determined. By evaluating the position parameters $\alpha_1$, $\alpha_2$, an unintentional change in position, in the present case in particular a belt jump, of the first traction mechanism 18 and/or the second traction mechanism 22 is then determined and definitely associated with one of the traction mechanism drives 16, 20.

The evaluation of the position parameters $\alpha_1$, $\alpha_2$ can also be carried out in the present case by means of two different evaluation methods, which in particular can also be combined with each other, whereby in particular a particularly safe and/or robust evaluation can be achieved.

According to a first evaluation method, in particular in addition to the position parameters $\alpha_1$, $\alpha_2$, the control parameter $\alpha_s$ is determined by the steering device by means of the sensor unit 24. In this case, the evaluation of the position parameters $\alpha_1$, $\alpha_2$ includes a comparison of the first position parameter $\alpha_1$ with the control parameter $\alpha_s$ and a comparison of the second position parameter $\alpha_2$ with the control parameter $\alpha_s$. For this purpose, the following inequalities are used:

$$|\alpha_1 \cdot i_G - \alpha_s| - \Delta_{LS1} > \left(WS \cdot \frac{i_G}{i_z}\right) \cdot x \qquad (1)$$

$$|\alpha_2 \cdot i_G - \alpha_s| - \Delta_{LS2} > \left(WS \cdot \frac{i_G}{i_z}\right) \cdot y \qquad (2)$$

with $$i_G = \frac{i_z \cdot i_{LG}}{i_s} \qquad (3)$$

$$\Delta_{LS1} = |\alpha_{1,init} \cdot i_G - \alpha_{S,init}| \qquad (4)$$

-continued $$\Delta_{LS2} = |\alpha_{2,init} \cdot i_G - \alpha_{S,init}| \quad (5)$$

$$WS = \frac{360°}{n} \quad (6)$$

The variable $i_G$ describes a transmission ratio between the first steering actuator 12 and the sensor unit 24 and/or between the second steering actuator 14 and the sensor unit 24 and defines in the present case a transmission ratio parameter between the first steering actuator 12 and the sensor unit 24 and/or between the second steering actuator 14 and the sensor unit 24. Further, $i_z$ describes the traction mechanism transmission ratio of the two traction mechanism drives 16, 20, wherein in this case, for the sake of simplification, it is assumed that the traction mechanism transmission ratios of the traction mechanism drives 16, 20 are identical ($i_{z1}=i_{z2}=i_z$). Furthermore, $i_{LG}$ describes a transmission ratio of the steering gear 10 and is describes a transmission ratio of the sensor unit 24. Accordingly, in the evaluation of the position parameters $\alpha_1$, $\alpha_2$ at least one transmission ratio parameter between the first steering actuator 12 and the sensor unit 24 and/or between the second steering actuator 14 and the sensor unit 24 is taken into account. In principle, a traction mechanism transmission ratio of a first traction mechanism drive and a second traction mechanism drive may also differ from each other, whereby in particular a transmission ratio between a first steering actuator and a sensor unit and between a second steering actuator and a sensor unit may also differ from each other.

The variable $\Delta_{LS1}$ describes a first initial offset parameter and is determined as a function of the first position parameter $\alpha_1$ and the sensor parameter $\alpha_s$. In the present case, the first initial offset parameter $\Delta_{LS1}$ is determined by forming a difference of a first initial position parameter $\alpha_{1,init}$ and an initial control parameter $\alpha_{s,init}$, wherein the first initial position parameter $\alpha_{1,init}$ and the initial control variable $\alpha_{s,init}$ and consequently the first initial offset parameter $\Delta_{LS1}$ will advantageously be determined at each system start. The same applies to the variable $\Delta_{LS2}$, which describes a second initial offset parameter and which is determined as a function of the second position parameter $\alpha_2$ and the sensor parameter $\alpha_s$. The second initial offset parameter $\Delta_{LS2}$ is determined by forming a difference of a second initial position parameter $\alpha_{2,init}$ and the initial control parameter $\alpha_{s,init}$, wherein the second initial position parameter $\alpha_{2,init}$ and the initial control parameter $\alpha_{s,init}$ and consequently the second initial offset parameter $\Delta_{LS2}$ are advantageously determined at each system start. Consequently, in the evaluation of the position parameters $\alpha_1$, $\alpha_2$ at least one initial offset parameter, in particular the first initial offset parameter $\Delta_{LS1}$ and the second initial offset parameter $\Delta_{LS2}$, is taken into account. Alternatively, at least one initial offset parameter could also be determined only once, in particular during manufacture and/or assembly of a steering device, and stored, for example, in the event of a shutdown and/or an absolute shutdown of the steering device. In this context, the steering device and/or a computing unit in particular could also include a so-called "sleep mode counter", which is provided to monitor changes of a first position parameter, a second position parameter and/or a control parameter at least in an inactive state and/or a switched off state of the steering device.

The variable WS defines an angle segmentation of the output element 26 and thus describes an angle between two teeth of the output element 26 and/or an angular resolution of the output element 26. In particular, n describes a number of teeth of the output element 26. Accordingly, in the evaluation of the position parameters $\alpha_1$, $\alpha_2$ at least one angle segmentation of the output element 26 is taken into account. Alternatively, however, it is also conceivable to relate the variable WS or the corresponding equations to the drive element 38, 40.

Furthermore, the variables x and y define pre-applied values and are determined once according to the following equations:

$$x = \left\lceil \frac{k_S}{WS \frac{i_G}{i_Z}} \right\rceil \quad (7)$$

$$y = \left\lceil \frac{k_S}{WS \frac{i_G}{i_Z}} \right\rceil \quad (8)$$

where $$w = \lceil z \rceil := \min\{w \in \mathbb{Z} \mid w \geq z\} \quad (9)$$

describes the so-called rounding up function. In addition, $k_s$ describes a resolution, in particular an angular resolution, of the sensor unit 24. Accordingly, in the evaluation of the position parameters $\alpha_1$, $\alpha_2$ at least one resolution of the sensor unit 24 is taken into account.

For example, with an exemplary resolution of the sensor unit 24 of $k_s=1°$, a transmission ratio $i_G/i_Z$ of $i_G=7$ and a number of teeth of the output element 26 of n=70 apply:

$$-x, y = \left\lceil \frac{1°}{\frac{360°}{70} \cdot 7} \right\rceil = \lceil 0,0278 \rceil = 1$$

The number of skipped teeth $N_1, N_2$ which can be detected, in particular in the context of the resolution of the sensor unit 24, can then be estimated in the context of the resolution of the sensor unit 24 as an integral multiple of x and/or y and/or can be calculated using the following equations:

$$|\alpha_1 \cdot i_G - \alpha_s| - \Delta_{LS1} = \left(WS \cdot \frac{i_G}{i_Z}\right) \cdot x \cdot N_1 \quad (10)$$

$$|\alpha_2 \cdot i_G - \alpha_s| - \Delta_{LS2} = \left(WS \cdot \frac{i_G}{i_Z}\right) \cdot y \cdot N_2 \quad (11)$$

On the basis of inequalities (1) and (2) or equations (10) and (11) and/or a comparison of inequalities (1) and (2) or equations (10) and (11) with each other, the unintentional change in position can be definitely associated with the first traction mechanism drive 16 or the second traction mechanism drive 20. Further, at least when using a traction mechanism 18, 22 in the form of a toothed belt and in the context of the resolution of the sensor unit 24, the number of skipped teeth $N_1, N_2$ can be specified.

According to a second evaluation method, which can be combined in particular with the first evaluation method, the evaluation of the position parameters $\alpha_1$, $\alpha_2$ includes a comparison of the first position parameter $\alpha_1$ with the second position parameter $\alpha_2$. By this evaluation method, an evaluation of the position parameters $\alpha_1$, $\alpha_2$ in particular can also be achieved when the sensor unit 24 has too low a resolution, a disturbance and/or a defect and/or when such a sensor unit is dispensed with. For this purpose, the following inequality is used:

$$|\alpha_1-\alpha_2|-\Delta_{LL}>WS \qquad (12)$$

with $$\Delta_{LL}=|\alpha_{1,init}-\alpha_{2,init}| \qquad (13)$$

The variable $\Delta_{LL}$ describes another initial offset parameter and is determined as a function of the first position parameter $\alpha_1$ and the second position parameter $\alpha_2$. In the present case, the further initial offset parameter $\Delta_{LL}$ is determined by forming a difference of the first initial position parameter $\alpha_{2,init}$ and the second initial position parameter $\alpha_{2,init}$, wherein the first initial position parameter $\alpha_{2,init}$ and the second initial position parameter $\alpha_{2,init}$ and consequently the further initial offset parameter $\Delta_{LL}$ are advantageously determined at each system start. Consequently, in this case, at least one initial offset parameter, in particular the further initial offset parameter $\Delta_{LL}$, is taken into account in the evaluation of the position parameters $\alpha_1$, $\alpha_2$. Alternatively, the further initial offset parameter $\Delta_{LL}$ could also be determined only once, in particular during manufacture and/or assembly of a steering device, and, for example, in the event of a shutdown and/or an absolute shutdown of the steering device. In this context, the steering device and/or a computer unit could also contain in particular a so-called "sleep mode counter", which is provided to monitor changes of a first position parameter and/or a second position parameter at least in an inactive state and/or a switched off state of the steering device.

The variable WS again defines the angle segmentation of the output element 26. Consequently, in this case, too, at least one angle segmentation of the output element 26 is taken into account in the evaluation of the position parameters $\alpha_1$, $\alpha_2$.

By the inequality (12), the presence of an unintentional change in position of the first traction mechanism 18 and/or the second traction mechanism 22 can be determined.

In order further to achieve a definite association of the unintentional change in position with the first traction mechanism drive 16 or the second traction mechanism drive 20, a comparison is also carried of a first speed parameter $v_2$ of the first steering actuator 12 with a second speed parameter $v_2$ of the second steering actuator 14. In the present case, a difference between a magnitude of the first speed parameter $v_2$ and a magnitude of the second speed parameter $v_2$ is formed and is compared with a pre-applied threshold value $T_v$, wherein the threshold value $T_v$ is adapted and/or selected in particular depending on a design of the steering device. Where:

$$|v_1|-|v_2|\geq T_v \qquad (14)$$

$$|v_1|-|v_2|<T_v \qquad (15)$$

If the difference between the magnitude of the first speed parameter $v_2$ and the magnitude of the second speed parameter $v_2$ is greater than or equal to the threshold value $T_v$ or if the inequality (14) is satisfied, it can be concluded from this that the unintentional change in position occurred in the first traction mechanism drive 16. However, if the difference between the magnitude of the first speed parameter $v_2$ and the magnitude of the second speed parameter $v_2$ is less than the threshold value $T_v$ or if the inequality (15) is satisfied, it can be concluded that the unintentional change in position occurred in the second traction mechanism drive 20.

Consequently, by the evaluation of the inequalities (12), (14) and (15), the unintentional change in position can be definitely associated with the first traction mechanism drive 16 or the second traction mechanism drive 20.

The first speed parameter $v_2$ corresponds in the present case further to a rotor speed and/or an angular velocity of the first steering actuator 12. Analogously, the second speed parameter $v_2$ corresponds to a rotor speed and/or an angular velocity of the second steering actuator 14. Preferably, the first speed parameter $v_2$ is determined by means of a differentiation of the first position parameter $\alpha_1$ and the second speed parameter $v_2$ is determined by means of a differentiation of the second position parameter $\alpha_2$, whereby advantageously additional speed sensor units can be dispensed with. In principle, however, it is also conceivable to determine at least one of the speed parameters $v_1$,$v_2$ by means of a speed sensor unit.

Figure 2:
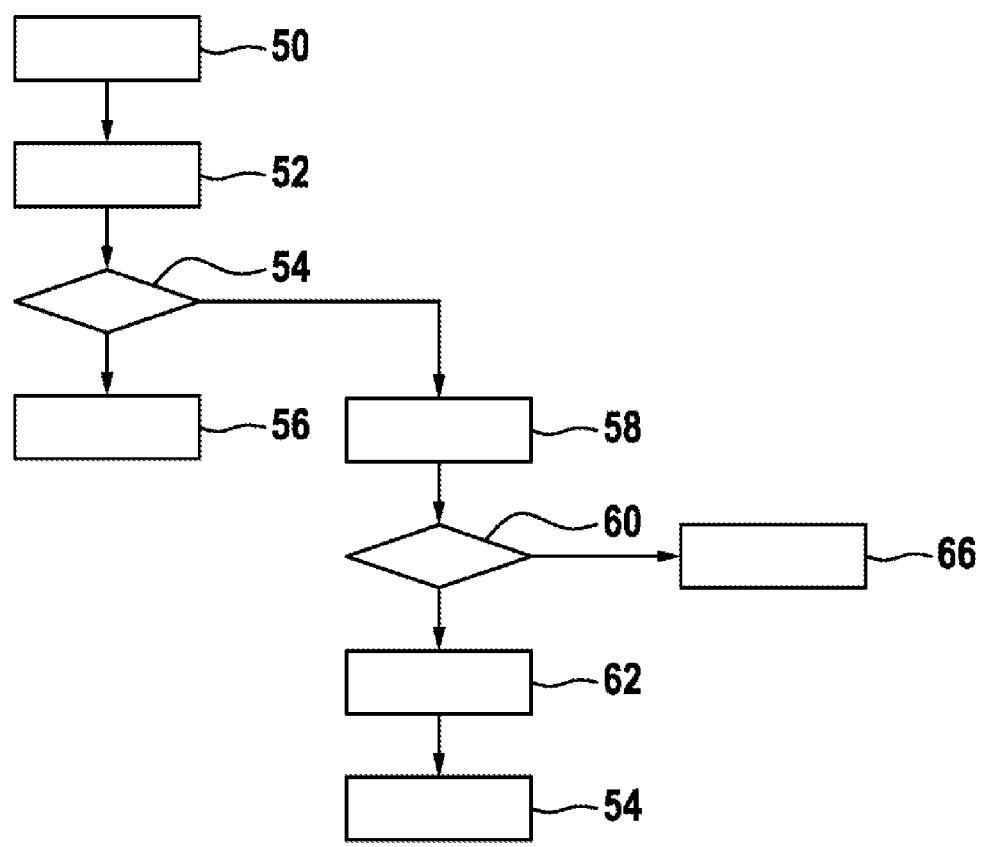

An exemplary flowchart of the method for monitoring the steering device is shown in FIG. 2.

In a step 50 of the method, the first position parameter $\alpha_1$ of the first steering actuator 12 and the second position parameter $\alpha_2$ of the second steering actuator 14 are determined.

In a step 52 of the method, in particular in addition to the position parameters $\alpha_1$, $\alpha_2$, the control parameter $\alpha_s$ of the steering device is determined by means of the sensor unit 24.

In a step 54 of the method, using the first evaluation method, the first position parameter $\alpha_1$ is compared with the control parameter $\alpha_s$ and the second position parameter $\alpha_2$ is compared with the control parameter $\alpha_s$. If an unintentional change in position, in the present case in particular a belt jump, of the first traction mechanism 18 and/or the second traction mechanism 22 is determined, a step 56 of the method follows. If, on the other hand, no unintentional change in the position of the first traction mechanism 18 and/or the second traction mechanism 22 is determined, a step 58 of the method follows.

In the step 56 of the method, in particular by the inequalities (1) and (2) or the equations (10) and (11) and/or a comparison of the inequalities (1) and (2) or the equations (10) and (11) with each other, the unintentional change in position is definitely associated with the first traction mechanism drive 16 or the second traction mechanism drive 20. Subsequently, for example, a warning message can be generated and/or a fail-safe mode of the vehicle can be initiated.

In the step 58 of the method, the evaluation method is changed from the first evaluation method to the second evaluation method.

In the step 60 of the method, using the second evaluation method, the first position parameter $\alpha_1$ is compared with the second position parameter $\alpha_2$. As a result of this, an evaluation of the position parameters $\alpha_1$, $\alpha_2$, in particular can also then be achieved when the sensor unit 24 has too low a resolution, a disturbance and/or a defect. If an unintentional change in position, in the present case in particular a belt jump, of the first traction mechanism 18 and/or the second traction mechanism 22 is determined, then a step 62 of the method and a step 64 of the method follow. If, on the other hand, no unintentional change in the position of the first traction mechanism 18 and/or the second traction mechanism 22 is determined, a step 66 of the method follows.

In the step 62 of the method, a first speed parameter $v_2$ of the first steering actuator 12 is determined, in particular by differentiating the first position parameter $\alpha_1$, and a second speed parameter $v_2$ of the second steering actuator 14 is determined, in particular by differentiating the second position parameter $\alpha_2$.

Subsequently, in the step 64 of the method, the first speed parameter $v_2$ is compared with the second speed parameter $v_2$, in order to achieve, in particular by means of the inequalities (14) and (15), a definite association of the unintentional change in position with the first traction mechanism drive 16 or the second train medium drive 20. Thereupon, for example, a warning message can be generated and/or a fail-safe mode of the vehicle can be initiated.

In the step 66 of the method, the method is terminated, and it is determined that at least in the context of the present evaluation methodology no unintentional change in position of the first traction mechanism 18 and/or the second traction mechanism 22 has taken place.

The exemplary flowchart in FIG. 2 is provided in particular to describe a method for monitoring the steering device only by way of example. In particular, individual steps of the method and/or a sequence of the steps of the method may also vary. In particular, it is also conceivable to omit steps 52, 54 and 56 of the method or steps 58, 60, 62 and 64 of the method. In addition, further optional steps of the method could be added.

The invention claimed is:

1. A method for monitoring a steering device, wherein the steering device comprises a steering gear, at least one first steering actuator, at least one second steering actuator, at least one first traction mechanism drive with at least one first traction mechanism configured to connect the at least one first steering actuator to the steering gear, and at least one second traction mechanism drive with at least one second traction mechanism configured to connect the at least one second steering actuator to the steering gear, comprising:
   determining at least one first position parameter of the at least one first steering actuator;
   determining at least one second position parameter of the at least one second steering actuator;
   evaluating the at least one first position parameter and the at least one second position parameter;
   determining that an error has occurred in one of a connection between the at least one first steering actuator and the steering gear and a connection between the at least one second steering actuator and the steering gear based upon the evaluation; and
   associating the determined error with one of the at least one first traction mechanism drive and at least one second traction mechanism drive.

2. The method as claimed in claim 1, wherein:
   the at least one first traction mechanism comprises a first toothed belt;
   the at least one second traction mechanism comprises a second toothed belt; and
   the error is a belt jump.

3. The method as claimed in claim 1, further comprising:
   determining at least one control parameter of the steering device, wherein
   the evaluation of the at least one first position parameter and the at least one second position parameter includes:
   comparing at least one of the at least one first position parameter and the at least one second position parameter with the determined at least one control parameter.

4. The method as claimed in claim 3, wherein determining the at least one control parameter comprises:
   using a sensor unit associated with the steering gear to determine the at least one control parameter, and a resolution of the sensor unit is taken into account in the evaluation of the at least one first position parameter and the at least one second position parameter.

5. The method as claimed in claim 4, wherein at least one transmission ratio parameter between at least one of the at least one first steering actuator and the sensor unit, and between the at least one second steering actuator and the sensor unit, is taken into account in the evaluation of the at least one first position parameter and the at least one second position parameter.

6. The method as claimed in claim 4, wherein at least one initial offset parameter is determined depending on at least one of the at least one first position parameter and the sensor unit, and the second at least one position parameter and the sensor unit, and the at least one initial offset parameter is taken into account in the evaluation of the at least one first position parameter and the at least one second position parameter.

7. The method as claimed in claim 3, wherein at least one angle segmentation of at least one output element of the at least one first traction mechanism drive and the at least one second traction mechanism drive is taken into account in the evaluation of the at least one first position parameter and the at least one second position parameter.

8. The method as claimed in claim 1, wherein the evaluation of the at least one first position parameter and the at least one second position parameter includes a comparison of the at least one first position parameter with the at least one second position parameter.

9. The method as claimed in claim 8, wherein at least one further initial offset parameter is determined as a function of the at least one first position parameter and the at least one second position parameter, and the at least one further initial offset parameter is taken into account in the evaluation of the at least one first position parameter and the at least one second position parameter.

10. The method as claimed in claim 8, wherein at least one angle segmentation of at least one output element of the at least one first traction mechanism drive and the at least one second traction mechanism drive is taken into account in the evaluation of the at least one first position parameter and the at least one second position parameter.

11. The method as claimed in claim 8, wherein the evaluation of the at least one first position parameter and the at least one second position parameter includes a comparison of a first speed parameter of the at least one first steering actuator with a second speed parameter of the at least one second steering actuator.

12. The method as claimed in claim 11, wherein the first speed parameter is determined using a differentiation of the at least one first position parameter, and the second speed parameter is determined using a differentiation of the at least one second position parameter.

13. A control unit with a computing unit configured to perform the method as claimed in claim 1.

14. A steering device with a steering gear, with at least one first steering actuator, with at least one second steering actuator, with at least one first traction mechanism drive which comprises at least one first traction mechanism configured to connect the at least one first steering actuator to the steering gear, with at least one second traction mechanism drive which comprises at least one second traction mechanism configured to connect the at least one second steering actuator to the steering gear, and with a computing unit configured to perform the method as claimed in claim 1.

* * * * *